United States Patent
Zhao et al.

(10) Patent No.: US 11,262,005 B2
(45) Date of Patent: Mar. 1, 2022

(54) SUPERHIGH TORSIONAL STRENGTH, METALLIC AND AIRTIGHT DRILLROD COUPLER

(71) Applicant: BAOSHAN IRON & STEEL CO., LTD., Shanghai (CN)

(72) Inventors: Peng Zhao, Shanghai (CN); Minghua Wang, Shanghai (CN); Shaofeng Liu, Shanghai (CN); Lin Yuan, Shanghai (CN); Bocheng Geng, Shanghai (CN)

(73) Assignee: Baoshan Iron & Steel Co., Ltd., Shanghai (CN)

( * ) Notice: Subject to any disclaimer, the term of this patent is extended or adjusted under 35 U.S.C. 154(b) by 466 days.

(21) Appl. No.: 14/778,371

(22) PCT Filed: Oct. 21, 2013

(86) PCT No.: PCT/CN2013/085552
§ 371 (c)(1),
(2) Date: Sep. 18, 2015

(87) PCT Pub. No.: WO2014/146428
PCT Pub. Date: Sep. 25, 2014

(65) Prior Publication Data
US 2016/0230909 A1    Aug. 11, 2016

(30) Foreign Application Priority Data
Mar. 21, 2013   (CN) .......................... 201310093446.9

(51) Int. Cl.
*F16L 15/00*   (2006.01)
*E21B 17/042*   (2006.01)

(52) U.S. Cl.
CPC .......... *F16L 15/001* (2013.01); *E21B 17/042* (2013.01)

(58) Field of Classification Search
CPC .............................. F16L 15/001; E21B 17/042
(Continued)

(56) References Cited

U.S. PATENT DOCUMENTS 3,359,013 A * 12/1967 Knox ...................... E21B 17/08
285/114
4,085,951 A * 4/1978 Morris .................. F16L 15/007
285/334

(Continued)

FOREIGN PATENT DOCUMENTS

CA   2721336 A1 * 11/2009 ........... E21B 17/042
CN   2575286 Y     9/2003
(Continued)

OTHER PUBLICATIONS

PCT International Search Report, PCT/CN2013/085552, dated Jan. 30, 2014, 8 pages.

*Primary Examiner* — Matthew Troutman
*Assistant Examiner* — Fannie C Kee
(74) *Attorney, Agent, or Firm* — Quarles & Brady LLP

(57) ABSTRACT

A superhigh torsional strength, metallic and airtight drillrod coupler including an externally threaded coupler having a radially outward outer shoulder at an end thereof in an axial direction, an inner end face at the other end thereof in the axial direction, and a first sealing face being provided in sequence in the axial direction of the externally threaded coupler. The coupler further includes an internally threaded coupler to be threadedly connected to the externally threaded coupler, the internally threaded coupler having a radially inward inner shoulder at an end thereof in an axial direction, and an outer end face at the other end thereof in the axial direction, with a second sealing face. Further, the (Continued)

first sealing face and the second sealing face are both sloped faces, and are in an interference-fit sealed connection with each other.

7 Claims, 4 Drawing Sheets

(58) Field of Classification Search
USPC .................................. 285/390, 333–334, 355
See application file for complete search history.

(56) References Cited

U.S. PATENT DOCUMENTS

| | | | | |
|---|---|---|---|---|
| 4,161,332 A * | 7/1979 | Blose | ................. | E21B 17/0423 |
| | | | | 285/334 |
| 4,373,754 A * | 2/1983 | Bollfrass | ............. | E21B 17/0426 |
| | | | | 285/334 |
| 4,538,840 A * | 9/1985 | DeLange | .............. | F16L 15/004 |
| | | | | 285/333 |
| 4,600,224 A * | 7/1986 | Blose | .................... | E21B 17/042 |
| | | | | 285/332.4 |
| 4,707,001 A * | 11/1987 | Johnson | ................ | E21B 17/042 |
| | | | | 285/332.3 |
| 4,728,129 A * | 3/1988 | Morris | ................ | E21B 17/0423 |
| | | | | 285/334 |
| 4,732,416 A * | 3/1988 | Dearden | ................ | F16L 15/004 |
| | | | | 285/333 |
| 6,347,814 B1 * | 2/2002 | Cerruti | .................... | E21B 17/08 |
| | | | | 285/332.4 |
| 6,349,979 B1 * | 2/2002 | Noel | .................... | F16L 15/004 |
| | | | | 285/333 |
| 6,478,344 B2 * | 11/2002 | Pallini, Jr. | ............. | E21B 17/042 |
| | | | | 285/333 |
| 6,767,035 B2 * | 7/2004 | Hashem | ................ | E21B 43/103 |
| | | | | 285/332.2 |
| 7,025,135 B2 * | 4/2006 | Ellington | ................ | E21B 17/08 |
| | | | | 166/206 |
| 2004/0155465 A1 * | 8/2004 | Noel | .................... | F16L 15/004 |
| | | | | 285/334 |
| 2008/0265575 A1 * | 10/2008 | Charvet-Quemin | ........................ | |
| | | | | E21B 17/042 |
| | | | | 285/331 |
| 2012/0175846 A1 | 7/2012 | Hedrick | | |

FOREIGN PATENT DOCUMENTS

| | | |
|---|---|---|
| CN | 2700542 Y | 5/2005 |
| CN | 201013259 Y | 1/2008 |
| CN | 201474625 U | 5/2010 |
| GB | 465538 A | 5/1937 |
| GB | 2064041 A | 6/1981 |

* cited by examiner

SUPERHIGH TORSIONAL STRENGTH, METALLIC AND AIRTIGHT DRILLROD COUPLER

CROSS-REFERENCE TO RELATED APPLICATIONS

This application represents the national stage entry of PCT International Application No. PCT/CN2013/085552 filed Oct. 21, 2013, which claims priority of Chinese Patent Application No. 201310093446.9 filed Mar. 21, 2013, the disclosures of which are incorporated by reference here in their entirety for all purposes.

FIELD OF THE INVENTION

The present invention relates to a coupler, and in particular relates to a drillrod coupler.

BACKGROUND ART

Currently, most of the drillrods used for oil drilling are manufactured according to the standards established by API (American Petroleum Institute). Generally, the structure of a drillrod for oil drilling has an externally threaded drillrod coupler and an internally threaded drillrod coupler which are respectively welded at the two ends of a drillrod tube body.

FIG. 1 shows a drillrod coupler manufactured as per the API standards. As shown in FIG. 1, the drillrod coupler is composed of an externally threaded coupler 11 and an internally threaded coupler 12 to be threadedly connected thereto; wherein the externally threaded coupler 11 has an outer shoulder 13 and an inner end face 15, with external threads 17 being provided between the outer shoulder 13 and the inner end face 15; and the internally threaded coupler 12 has an outer end face 14 and an inner sloped face 16, with internal threads 18 being provided between the outer end face 14 and the inner sloped face 16.

The torque borne by the drillrod coupler as shown in FIG. 1 originates from the moment of friction generated between the outer shoulder 13 and the outer end face 14, and between the external threads 17 and the internal threads 18. According to the API standards, the torsional strength of the coupler is generally 80% of that of the drillrod tube body. However, with the gradual consumption of the oil and natural gas resources, well-drilling technologies have turned to deep wells, super deep wells, directional wells, extended reach wells, horizontal wells, etc., and accordingly, the conditions in which drillrods operate become more and more severe, the drillrods and the couplers thereof must be able to withstand huge internal and external pressures, and have large torsional strength and vibration strength. If the coupler encounters a too large torque during use, it is highly likely to result in malfunctions such as swelling of an internally threaded coupler or thread breakage of an externally threaded coupler and the like, thus leading to accidents in well drilling.

The Chinese patent publication no. CN 2764922, published on 15 Mar. 2006 and entitled "DUAL-SHOULDER METALLIC AIRTIGHT DRILLROD COUPLER" proposes a high torsional strength, metallic and airtight drillrod coupler. As shown in FIG. 2, the drillrod coupler is composed of an externally threaded coupler 21 and an internally threaded coupler 22, wherein the externally threaded coupler 21 has an outer shoulder 23 and an inner end face 25 with external threads 27 extending axially therebetween, and the externally threaded coupler further has a front-end conical metal seal 20 between the inner end face 25 and the external threads 27; and the internally threaded coupler 22 has an outer end face 24 and an inner shoulder 26 with internal threads 28 extending axially therebetween, and the internally threaded coupler 22 further has a rear-end spherical metal seal 29 between the inner shoulder 26 and the internal threads 28; the fit of the sealing faces between the two metal seals is a conical face to spherical face fit.

The Chinese patent publication no. CN 201474625, published on 19 May 2010 and entitled "SUPERHIGH TORSIONAL STRENGTH, METALLIC AND AIRTIGHT DRILLROD COUPLER" discloses a metallic airtight drillrod coupler with superhigh resistance to torsion. As shown in FIG. 3, the drillrod coupler is composed of an externally threaded coupler 31 and an internally threaded coupler 32, the externally threaded coupler 31 has a conical sealing face 33, and the internally threaded coupler 32 has a spherical sealing face 34; at the same time, the externally threaded coupler 31 is further provided with external threads 35, the internally threaded coupler 32 is further provided with internal threads 36; and both the external threads 35 and the internal threads 36 have a taper in the range of $1/12$-$1/20$.

SUMMARY OF THE INVENTION

An object of the present invention is to provide a superhigh torsional strength, metallic and airtight drillrod coupler, which should not only have a relatively high torsional strength, but also have relatively high airtight sealing and good performance in terms of repeated threaded connection and disconnection.

According to the above-mentioned object, the present invention proposes a superhigh torsional strength, metallic and airtight drillrod coupler, which comprises:

an externally threaded coupler, which has a radially outward outer shoulder at an end thereof in an axial direction and an inner end face at the other end thereof in the axial direction, with an externally threaded section and a first sealing face being provided in sequence in the axial direction of the externally threaded coupler from the outer shoulder to the inner end face; and an internally threaded coupler to be threadedly connected to said externally threaded coupler, the internally threaded coupler having a radially inward inner shoulder at one end thereof in an axial direction and an outer end face at the other end thereof in the axial direction, with a second sealing face and an internally threaded section to be engaged with the externally threaded section being provided in sequence in the axial direction of the internally threaded coupler from the inner shoulder to the outer end face;

wherein said inner end face mates with a shoulder face of the inner shoulder, and the outer end face mates with a shoulder face of the outer shoulder; and said first sealing face and the second sealing face are both sloped faces, and are in an interference-fit sealed connection with each other.

The distance between the outer shoulder and the inner end face of the externally threaded coupler in this technical solution is larger than the distance between the outer shoulder and the inner end face of an externally threaded coupler of a drillrod as per the API standards, but smaller than the distance between the inner shoulder and the outer end face of the internally threaded coupler of the drillrod as per the API standards.

Furthermore, the inner end face and the shoulder face of the inner shoulder are both sloped faces. This configuration can, on one hand, form an additional moment of friction by increasing the contact area between the internally and externally threaded couplers, thus improving the torsional strength of the drillrod coupler and, on the other hand, serve as an auxiliary seal to further enhance the sealing performance of the drillrod coupler.

Furthermore, the angle of inclination of the inner end face and the shoulder face of the inner shoulder is −15 degrees.

Furthermore, the internally threaded section and the externally threaded section are inclined with respect to a horizontal plane.

Furthermore, the taper of inclination of the internally threaded section and the externally threaded section is not larger than 1:12.

Both a coupler in compliance with the API standards and an existing high torsional strength coupler have a taper of 1:6. In the present implementation of this technical solution, the design of the internally and externally threaded couplers having a relatively gentle taper can increase the contact area between the inner end face of the externally threaded coupler and the shoulder face of the inner shoulder of the internally threaded coupler, so as to form an additional moment of friction, improving the torsional strength of the drillrod coupler.

Preferably, the taper of inclination of the internally threaded section and the externally threaded section is 1:16.

Furthermore, between the internally threaded section and the outer end face is a bore surface which extends axially.

Furthermore, between the outer shoulder and the externally threaded section is a base surface which extends axially.

Furthermore, the magnitude of interference of the abovementioned interference-fit sealed connection is 0.10-0.40 mm. Setting the magnitude of interference at 0.10-0.40 mm can better reach the sealing fit between the internally and externally threaded couplers, so as to enhance the sealing effect between the two.

Furthermore, when the externally threaded coupler and the internally threaded coupler are screwed up manually, there is a clearance of 0-0.5 mm between the inner end face and the shoulder face of the inner shoulder. Due to the interference-fit sealed connection between the internally and externally threaded couplers, when the two are screwed up manually, the inner end face of the externally threaded coupler and the inner shoulder of the internally threaded coupler probably form a tiny clearance; and in the case of screwing up with a super torque or of a too high torque in the well, the clearance between the inner end face of the externally threaded coupler and the inner shoulder of the internally threaded coupler will decrease gradually until disappearing, at which point the coupler portions of the drillrods form a complete rigid body, making the couplers have a high torsional strength and a relatively high resistance to bending.

Compared with the API standard couplers, the superhigh torsional strength, metallic and airtight drillrod coupler according to the present invention has a higher torsional strength, with an improvement of about 70% in torsional strength over the API standard couplers.

Compared with the existing high torsional strength couplers, the superhigh torsional strength, metallic and airtight drillrod coupler according to the present invention also has a relatively high torsional strength, and has an airtight sealing capability up to 100 Mpa, exhibiting superior airtight sealing performance, and at the same time, the superhigh torsional strength, metallic and airtight drillrod coupler according to the present invention further has good performance in terms of repeated threaded connection and disconnection.

In summary, the superhigh torsional strength, metallic and airtight drillrod coupler according to the present invention has high torsional strength, good airtight sealing performance, and good performance in terms of repeated threaded connection and disconnection, broadly applicable in deep wells, super deep wells, directional wells, horizontal wells, highly deviated wells and other high-pressure gas well exploration operation with superhigh difficulties and complex conditions.

BRIEF DESCRIPTION OF THE ACCOMPANYING DRAWINGS

DETAILED DESCRIPTION OF THE INVENTION

The superhigh torsional strength, metallic and airtight drillrod coupler according to the present invention will be further described below in details with reference to the attached drawings and a particular embodiment, however, this description does not improperly limit the technical solution of the present invention.

Figure 1:
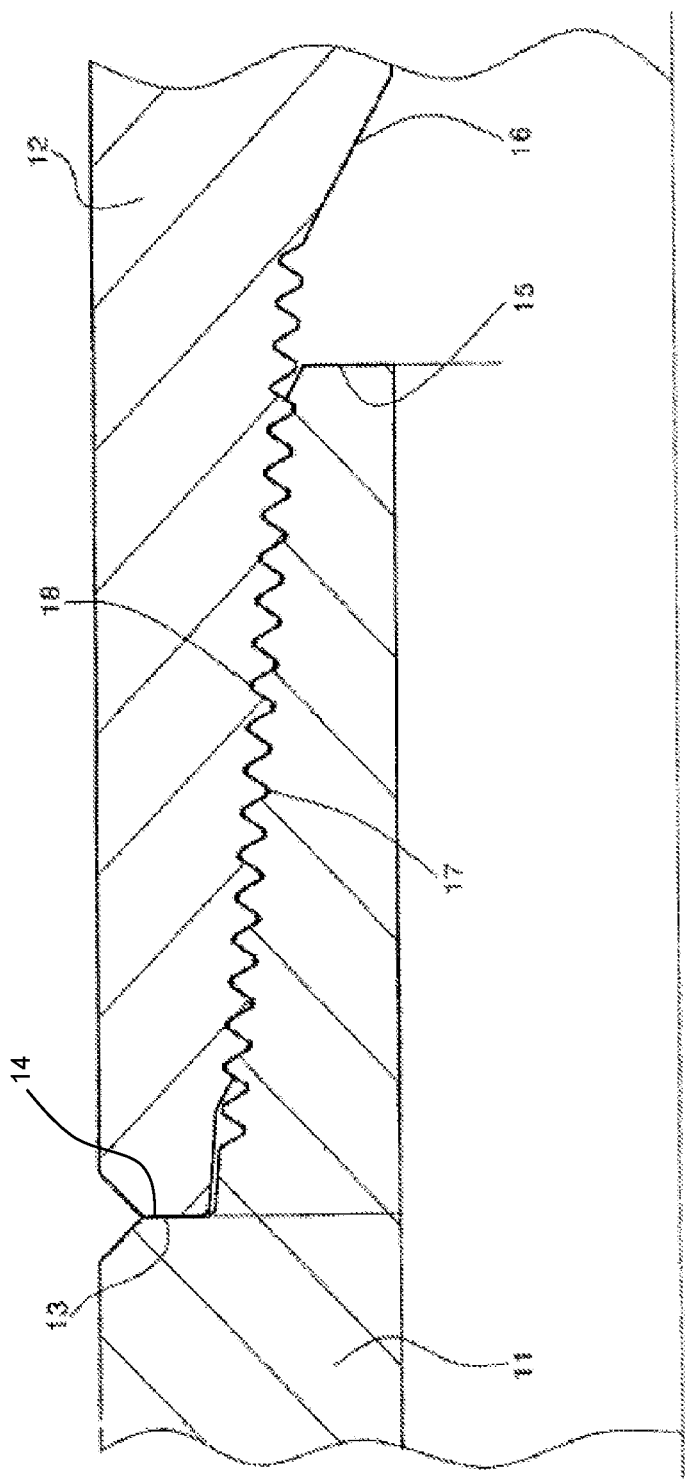
FIG. 1 is a schematic diagram of the structure of an API standard coupler.
Figure 2:
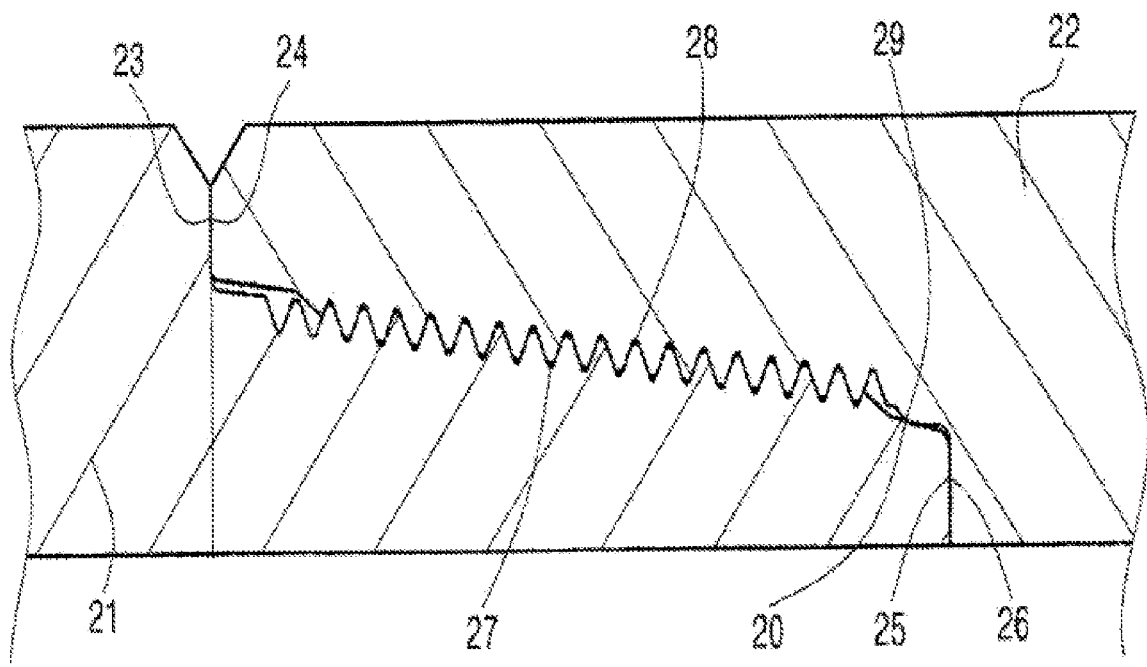
FIG. 2 is a schematic diagram of the structure of a prior art drillrod coupler.
Figure 3:
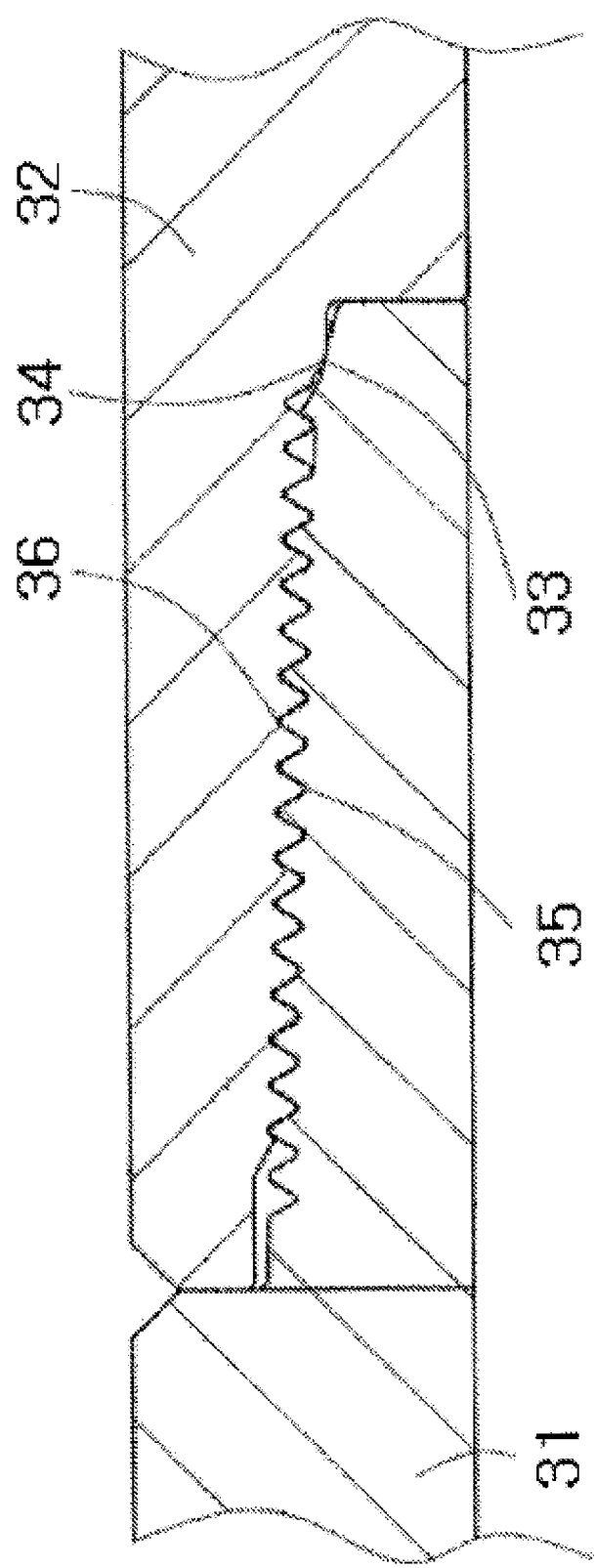
FIG. 3 is a schematic diagram of the structure of another prior art drillrod coupler.
Figure 4:
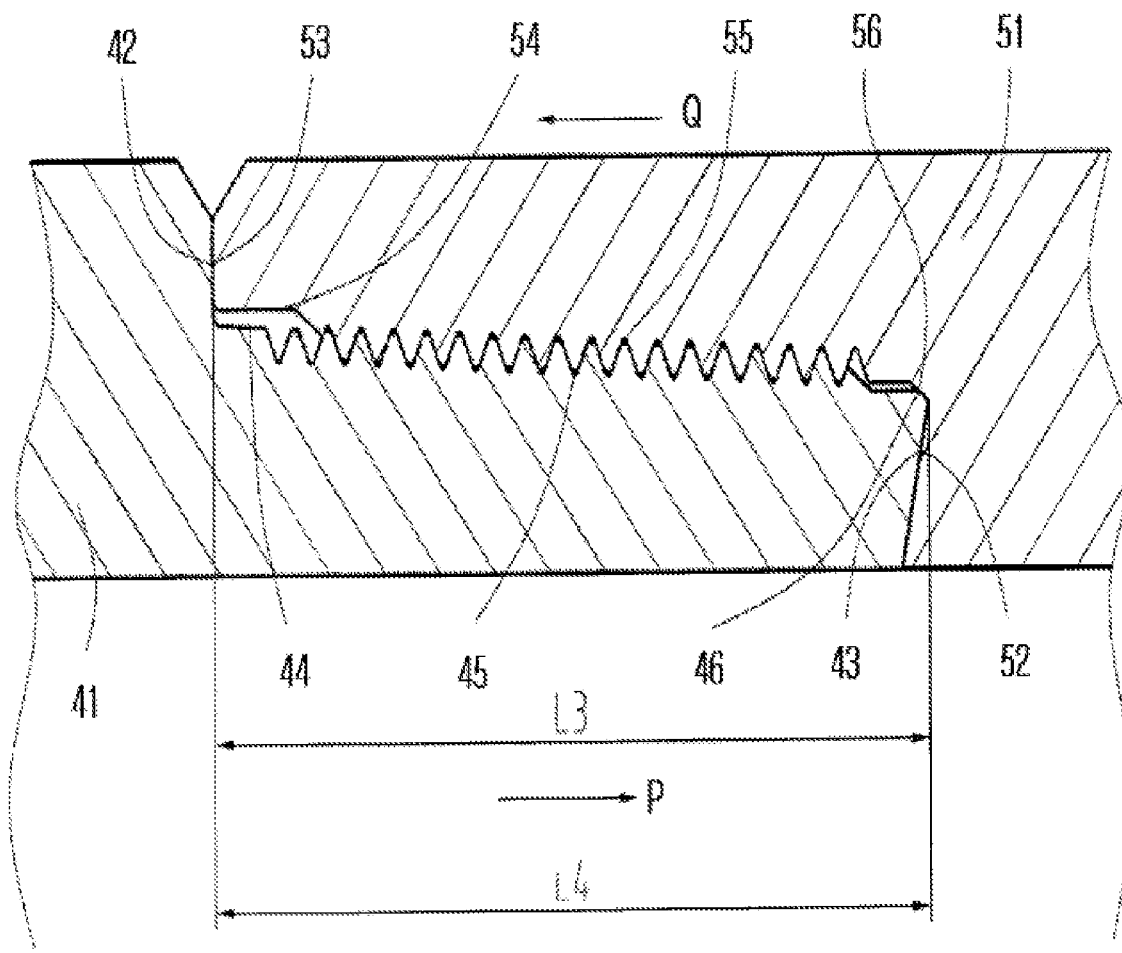
FIG. 4 is a schematic diagram of the structure of an implementation of a superhigh torsional strength, metallic and airtight drillrod coupler according to the present invention.

As shown in FIG. 4, in the present embodiment, the superhigh torsional strength, metallic and airtight drillrod coupler has an outer diameter of 184.15 mm and an inner diameter of 88.9 mm, and comprises an externally threaded coupler 41 and an internally threaded coupler 51, with the externally threaded coupler 41 and the internally threaded coupler 51 being in engaged connection with each other by means of their respective threaded sections.

Referring further to FIG. 4, one end of the externally threaded coupler in an axial direction is provided with a radically outward outer shoulder 42, and the other, opposite end thereof is provided with an inner end face 43, with a base surface 44, an obliquely arranged externally threaded section 45 and a first sealing sloped face 46 being provided in sequence in the direction P from the outer shoulder 42 towards the inner end face 43; and one end of the internally threaded coupler 51 in an axial direction is provided with a radially inward inner shoulder 52, and the other, opposite end thereof is provided with an outer end face 53, with a second sealing sloped face 56, an internally threaded section 55 to be engaged with the externally threaded section, and a bore surface 54 being provided in sequence in the direction Q from the inner shoulder 52 towards the outer end face 53. The first sealing sloped face 46 and the second sealing sloped face 56 are both sloped faces, and are in an interference-fit sealed connection with each other; the inner end face 43 mates with the sloped shoulder face of the inner shoulder 52, with the angle of inclination angle being −15°, and the outer end face 53 mates with the shoulder face of the outer shoulder 42.

In this embodiment, when it is required to connect individual drillrods to form a relatively long well-drilling drillrod, two adjacent drillrods are screwed up manually by hands, at which point the clearance between the inner end face of the externally threaded coupler and the shoulder face of the inner shoulder of the internally threaded coupler is 0.15 mm.

In addition, as shown in FIG. 4, the length between the outer end face 53 and the inner shoulder 52 of the internally threaded coupler 51 is L4, the length between the inner end face 43 and the outer shoulder 42 of the externally threaded coupler 41 is L3, and thus the clearance of 0.15 mm is a value of the length L4 minus the length L3.

Moreover, in this embodiment, the taper of inclination of the internally threaded section 55 and the externally threaded section 45 is 1:16.

Additionally, in this embodiment, the magnitude of interference between the first sealing sloped face 46 and the second sealing sloped face 56 is 0.20 mm.

It should be noted that what are set forth above are only particular embodiments of the present invention, and that clearly the present invention is not to be limited to these embodiments, but covers many similar variations thereof. All of the variations either directly derived from or associated with the disclosure of the present invention by those skilled in the art will fall into the protective scope of the present invention.

The invention claimed is:

1. A superhigh torsional strength, metallic and airtight drillrod coupler, comprising:
   an externally threaded coupler, which has a radially outward outer shoulder at an end thereof in an axial direction and an inner end face at the other end thereof in the axial direction, with an externally threaded section and a first sealing face being provided in sequence in the axial direction of the externally threaded coupler from the outer shoulder to the inner end face; and
   an internally threaded coupler to be threadedly connected to said externally threaded coupler, the internally threaded coupler having a radially inward inner shoulder at one end thereof in an axial direction and an outer end face at the other end thereof in the axial direction, with a second sealing face and an internally threaded section to be engaged with the externally threaded section being provided in sequence in the axial direction of the internally threaded coupler from the inner shoulder to the outer end face;
   wherein said inner end face mates with a shoulder face of the inner shoulder, and the outer end face mates with a shoulder face of the outer shoulder, said inner end face and the shoulder face of the inner shoulder are both sloped faces, and said outer end face and the shoulder face of the outer shoulder are both orthogonal surfaces and form a closed connection;
   wherein that:
   said first sealing face and the second sealing face are both linearly sloped faces, and are in an interference-fit sealed connection with each other at an inner end, wherein the inner end is formed by the first sealing face and the inner end face;
   wherein the first sealing face and the inner end face are continuously connected and there is a sealed connection between the inner end face and the first sealing face;
   wherein said internally threaded section and the externally threaded section are angularly inclined with respect to a central axis so as to taper from one axial end of the respective threaded section to the other axial end of the respective threaded section;
   wherein between said internally threaded section and the outer end face is a bore surface which extends axially;
   wherein between said outer shoulder and said externally threaded section is a base surface which extends axially; and
   wherein a gap extends from the closed connection between said outer end face and the shoulder face of the outer shoulder between the base surface, the bore surface, and a portion of the externally threaded section to form a closed air space.

2. The superhigh torsional strength, metallic and airtight drillrod coupler according to claim 1, wherein the angle of inclination of said inner end face and the shoulder face of the inner shoulder is −15 degrees.

3. The superhigh torsional strength, metallic and airtight drillrod coupler according to claim 1, wherein the taper of inclination of said internally threaded section and the externally threaded section is no larger than 1:12.

4. The superhigh torsional strength, metallic and airtight drillrod coupler according to claim 3, wherein the taper of inclination of said internally threaded section and the externally threaded section is 1:16.

5. The superhigh torsional strength, metallic and airtight drillrod coupler according to claim 1, wherein a magnitude of interference of said interference-fit sealed connection is 0.10-0.40 mm.

6. The superhigh torsional strength, metallic and airtight drillrod coupler according to claim 1, wherein when said externally threaded coupler and said internally threaded coupler are screwed up manually, there is a clearance between the inner end face and the shoulder face of the inner shoulder that is 0-0.5 mm.

7. The superhigh torsional strength, metallic and airtight drillrod coupler according to claim 1, wherein the drillrod coupler has an airtight sealing capability up to 100 MPa.

* * * * *